United States Patent
Brown et al.

(10) Patent No.: US 12,484,584 B2
(45) Date of Patent: Dec. 2, 2025

(54) METHODS AND USES OF A MIXTURE COMPRISING ALPHA-CYPERMETHRIN AND DINOTEFURAN FOR CONTROLLING BED BUGS

(71) Applicant: BASF AGRO B.V., Arnhem (NL)

(72) Inventors: Kenneth Scott Brown, Research Triangle Park, NC (US); Clark D. Klein, Research Triangle Park, NC (US); Frederick C. Gordon, Research Triangle Park, NC (US)

(73) Assignee: BASF AGRO B.V., Arnhem (NL)

( * ) Notice: Subject to any disclaimer, the term of this patent is extended or adjusted under 35 U.S.C. 154(b) by 661 days.

(21) Appl. No.: 17/801,825

(22) PCT Filed: Feb. 17, 2021

(86) PCT No.: PCT/EP2021/053841
§ 371 (c)(1),
(2) Date: Aug. 24, 2022

(87) PCT Pub. No.: WO2021/170462
PCT Pub. Date: Sep. 2, 2021

(65) Prior Publication Data
US 2023/0077477 A1  Mar. 16, 2023

Related U.S. Application Data

(60) Provisional application No. 62/983,209, filed on Feb. 28, 2020.

(30) Foreign Application Priority Data

Apr. 3, 2020  (EP) .................................... 20168027

(51) Int. Cl.
*A01N 51/00* (2006.01)
*A01N 25/04* (2006.01)
*A01N 25/14* (2006.01)
*A01N 53/00* (2006.01)
*A01P 7/04* (2006.01)

(52) U.S. Cl.
CPC ............. *A01N 51/00* (2013.01); *A01N 25/04* (2013.01); *A01N 25/14* (2013.01); *A01N 53/00* (2013.01); *A01P 7/04* (2021.08)

(58) Field of Classification Search
CPC .......... A01P 7/04; A01N 25/04; A01N 25/14; A01N 51/00; A01N 53/00
See application file for complete search history.

(56) References Cited

U.S. PATENT DOCUMENTS

| | | | |
|---|---|---|---|
| 2008/0319023 A1* | 12/2008 | Richman ................ | A01N 53/00 514/341 |
| 2015/0025118 A1* | 1/2015 | Sonneck ................ | A01N 43/08 514/465 |
| 2015/0289513 A1* | 10/2015 | Horstmann ............ | A01N 53/00 558/426 |
| 2018/0139960 A1* | 5/2018 | Sikuljak ................ | A01N 25/08 |
| 2021/0186009 A1* | 6/2021 | Ko .......................... | A01N 25/04 |

FOREIGN PATENT DOCUMENTS

| | | |
|---|---|---|
| CN | 102415406 A | 4/2012 |
| WO | WO-2017/004193 A1 | 1/2017 |

OTHER PUBLICATIONS

CN102415406, English translation, 2010 (Year: 2010).*
European Search Report for EP Patent Application No. 20168027.9, Issued on Aug. 31, 2020, 3 pages.
Hui-Qin, et al., "Efficacy of the mixture of dinotefuran and alpha-cypermethrin against resistant Musca domestica", Chinese Journal of Hygienic Insecticides & Equipments, Issue 1, Feb. 29, 2016 pp. 19-21 & p. 25.
International Application No. PCT/EP2021/053841, Interational Search Report and Written Opinion, mailed May 11, 2021.

* cited by examiner

*Primary Examiner* — Umamaheswari Ramachandran
(74) *Attorney, Agent, or Firm* — MARSHALL, GERSTEIN & BORUN LLP

(57) ABSTRACT

The present invention relates to uses and methods for combating or controlling bed bugs, by applying a mixture comprising alpha-cypermethrin and dinotefuran. The mixture is applied in a weight ratio of from 500:1 to 1:500 to said bed bugs, their habitat, breeding grounds or inside human habitation buildings. The treatment is done preferably in the bedroom, preferably to the bed or parts thereof, or to upholstered furniture.

13 Claims, No Drawings

METHODS AND USES OF A MIXTURE COMPRISING ALPHA-CYPERMETHRIN AND DINOTEFURAN FOR CONTROLLING BED BUGS

CROSS-REFERENCE TO RELATED APPLICATIONS

This is the U.S. national phase of International Application No. PCT/EP2021/053841, filed Feb. 17, 2021, which claims the benefit of U.S. Provisional Patent Application No. 62/983,209, filed Feb. 28, 2020, incorporated herein by reference in its entirety, and European Patent Application No. 20168027.9, filed on Apr. 3, 2020.

The present invention relates to methods and uses of a mixture comprising alpha-cypermethrin and dinotefuran for combating or controlling bed bugs.

Bed bugs are a type of indoor pest insect that feed on human blood, usually at night. Their bites can result in skin rashes, itchiness, allergic symptoms, lack of sleep and psychological effects.

Bed bugs are crawling insects typically feeding on uncovered areas of the body with bites often occurring in rows of three or more. Bed bugs hide during the day and are commonly active between midnight and 5 a.m. They find humans based on body temperatures and carbon dioxide emitted while breathing. As they can live up to one year without feeding, they are able to persist in abandoned rooms (e.g. temporarily non-occupied hotel rooms, summer homes, dormitories) for extended periods, if not combatted efficiently.

Though their blood feeding is a nuisance, bed bugs are not implicated in the transmission of infectious diseases. Bed bugs are not only a problem in tropical countries. They live all over the world with their populations increasing even in the developed world, due to many factors including increased travel activity. Though perceived to be associated with the lack of hygiene, bed bug infestations are typically initiated by the bed bugs, themselves being carried over from an infested place, such as hotels or even aircraft seats, where visitors change frequently. Bed bugs usually live on or near the bed, e.g. in upholstery, bed covers, box spring parts or clothes stored nearby, to facilitate crawling, at night, to and feeding on the human host sleeping in the bed. Very often, bed bugs crawl into luggage and hide there, travelling with the guest, and crawling out in the new location, e.g. in a new hotel or a private home. The infestation rate of even highly rated hotels, though not publically discussed, can be quite high. Also, second-hand furnishings may be a source of infestation, if not inspected thoroughly.

Once an infestation is detected (presence of bed bugs), it is recommended to combat the pest immediately by removing all visible bugs, vacuuming, washing all clothing and bedding at high temperatures, and applying a chemical pesticide with effective residual activity. Chemical pesticide applications to combat bed bugs are typically made by a professional pest control solution provider.

Therefore, there is a need for efficient and effective chemical pesticides, to ensure proper treatment and prevention of bed bug infestations.

As insecticides, pyrethroids are the main class applied for this purpose, as this class of insecticides shows a high lethal effect for insects and a much lower toxicity for mammals at the same time. Further, the insect is paralyzed very quickly, before it can bite and cause symptoms (so-called knockdown effect).

After many years of increasing use of pyrethroids, resistance is more and more on the rise, even more, as these insecticides are also used in agriculture. Pyrethroid resistant strains of the bed bug *Cimex lectularius* have been reported in the US, France, Australia and elsewhere. When adding a further insecticide, there are concerns that the total amount of insecticides applied will increase, with potential negative side-effects.

It has now been surprisingly found that the combination of alpha-cypermethrin and dinotefuran has a synergistic effect on bed bugs, which means that the total amount of insecticide can be reduced while preserving excellent insecticidal activity.

Therefore, the invention relates to a method for combating or controlling bed bugs, which method comprises applying a pesticidally effective amount of a mixture of alpha-cypermethrin and dinotefuran in a weight ratio of from 500:1 to 1:500 to said bed bugs, their habitat, breeding grounds or inside human habitation buildings.

Likewise, the invention relates to the use of a mixture comprising alpha-cypermethrin and dinotefuran in a weight ratio of from 500:1 to 1:500, for combating or controlling bed bugs. The use comprises applying the mixture of the present invention to said bed bugs, their habitat, breeding grounds or inside human habitation buildings.

Alpha-Cypermethrin (racemate comprising (R)-α-cyano-3-phenoxybenzyl (1S, 3S)-3-(2,2-dichlorovinyl)-2,2-dimethylcyclopropanecarboxylate; (S)-α-cyano-3-phenoxybenzyl (1R, 3R)-3-(2,2-dichlorovinyl)-2,2-dimethylcyclopropanecarboxylate) is a known insecticide from the class of pyrethroids and is commercially available. Pyrethroids are repellent insecticides that induce a toxic effect on the insect's nervous system. Pyrethroids obstruct the normal function of an insect's sodium channels resulting in the loss of function of the nerve cell, shutdown of the insect nervous system and ultimately death.

Dinotefuran ((RS)-1-methyl-2-nitro-3-(tetrahydro-3-furylmethyl) guanidine) is a non-repellent insecticide of the neonicotinoid class used to control pests. Its mode of action involves the disruption of the insect's nervous system by inhibiting nicotinic acetylcholine receptors and has been found useful in controlling pyrethroid resistant pests. Dinotefuran acts through contact and ingestion and results in death shortly after contact. Dinotefuran is a fast-acting agent. However, it is more subject to photo degradation.

As mentioned above, bed bugs are ectoparasitic insects that feed on blood, particularly that of humans. Their size ranges between 1 and 7 mm. They spread by crawling between nearby locations or by being carried within personal items. Bed bugs spend much of their time in dark, hidden locations like mattress seams or cracks in a wall.

Bed bugs typically feed at night and are often found in hiding places such as seams of mattresses, crevices in box springs and under baseboards or loose wall paper. Bed bugs have 5 nymphal stages prior to reaching adulthood. The life span of a bed bug, once reaching the adult stage, is about 6-12 months.

Main bed bug species are *Cimex lectularius* (the common bed bug) and *Cimex hemipterus* (the tropical bed bug). Therefore, in one embodiment, the invention relates to methods or uses according to the invention, wherein the bed bug is selected from *Cimex lectularius* and *Cimex hemipterus*.

Due to the use of pyrethroids over many years, it has been observed that some bed bugs have become resistant to pyrethroids, i.e. they are less or not susceptible to pyrethroids any longer. Pyrethroids do not harm them to the extent expected or compared to other bed bug strains. This property may be due to a genetic modification, for example a slight modification in the target ligand in the bed bug, or in the metabolism of the bed bug.

Therefore, in one aspect, the invention relates also to methods and uses for combating or controlling bed bugs, where the bed bugs are pyrethroid-resistant.

As used herein, the term "mixture(s) of the present invention" or "mixture(s) according to the invention" refers to the mixtures comprising alpha-cypermethrin and dinotefuran.

In one embodiment of the invention, the mixture applied in the methods and uses of the present invention comprises only alpha-cypermethrin and dinotefuran as active ingredients in the composition (binary mixture). However, further actives may be added in the present invention if they do not act negatively on the mixture of alpha-cypermethrin and dinotefuran.

It has also been found that simultaneous, that is joint or separate, application of alpha-cypermethrin and dinotefuran, or successive application of alpha-cypermethrin and dinotefuran allows enhanced control of bed bugs, compared to the control rates that are possible with the individual compounds.

The mixtures of the invention may be a physical mixture of alpha-cypermethrin and dinotefuran. In a preferred embodiment of the invention, the invention relates to methods and uses for combating or controlling bed bugs, by applying a composition comprising alpha-cypermethrin and dinotefuran. In a further preferred embodiment, the composition to be applied is obtained from a concentrated composition comprising alpha-cypermethrin and dinotefuran.

On the other hand, alpha-cypermethrin and dinotefuran may be present in different compositions to be combined in the methods according to the invention, it not being required for alpha-cypermethrin and dinotefuran to be present together in the same formulation.

An example of a composition according to the invention or to be used according to the invention in which alpha-cypermethrin and dinotefuran are not present together in the same formulation is a co-pack. In a co-pack, two or more components are packaged separately, i.e., not jointly pre-formulated. As such, co-packs include one or more separate containers such as vials, cans, bottles, pouches, bags or canisters, each container containing a separate component for a composition. One example is a two-component co-pack. Accordingly, the invention also relates to a two-component co-pack, comprising a first component which in turn comprises alpha-cypermethrin, a liquid or solid carrier and, if appropriate, at least one surfactant and/or at least one customary auxiliary, and a second component which in turn comprises dinotefuran, a liquid or solid carrier and, if appropriate, at least one surfactant and/or at least one customary auxiliary. More details, e.g. as to suitable liquid and solid carriers, surfactants and customary auxiliaries are described below.

In one embodiment, the composition to be applied is a diluted composition obtained from two different concentrated compositions, one for each active ingredient, which are combined during or after diluting, i.e. while preparing the composition to be applied. This is often referred to as "tank mix".

The "combined" use of alpha-cypermethrin "in combination with" dinotefuran on the one hand can be understood as using a physical mixture of alpha-cypermethrin and dinotefuran. On the other hand, the combined use may also consist in using alpha-cypermethrin and dinotefuran separately, but within a sufficiently short time of one another so that the desired effect can take place. More detailed illustrations of the combined use can be found in the specifications below.

Alpha-cypermethrin and dinotefuran are usually applied in a weight ratio of 1000:1 to 1:1000, preferably from 500:1 to 1:500, preferably from 100:1 to 1:100, in particular from 20:1 to 1:20 or 10:1 to 1:10.

Alpha-cypermethrin and dinotefuran may also be applied in a weight ratio of 500:1 to 1:10, or 100:1 to 1:10, or 50:1 to 1:10, or 20:1 to 1:10, or 10:1 to 1:500, or 10:1 to 1:100, or 10:1 to 50:1, or 10:1 to 1:20. They may also be applied in a weight ratio of 1:1 to 1:5, preferably 1:2, 1:3, 1:4 or 1:5.

In one embodiment of the invention, the weight ratio is around 1:2. The term "around" is to be understood to allow for some tolerance above and below the exact weight ratio. This tolerance might be up to 50%, so 0.5:2 to 1:3 would be still covered by the term "around 1:2".

FORMULATIONS

In the methods and uses of the invention, alpha-cypermethrin and dinotefuran are provided as compositions comprising an auxiliary and the mixture of the present invention.

A composition comprises a pesticidally effective amount of the mixture of the present invention.

The term "pesticidally effective amount" is defined below.

The mixtures of the present invention can be converted into customary types of compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, 6th Ed. May 2008, CropLife International.

The compositions are prepared in a known manner, as for similar agrochemical compositions, such as described by Mollet and Grube-mann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers, and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignin sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide.

Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the mixtures of the present invention on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-soluble Concentrates (SL, LS)

10-60 wt % of a compound I or II or a mixture according to the invention and 5-15 wt. % wetting agent (e.g. alcohol alkoxylates) are dissolved in water and/or in a water-soluble solvent (e.g. alcohols) up to 100 wt. %. The active substance dissolves upon dilution with water.
ii) Dispersible Concentrates (DC)

5-25 wt. % of a compound I or II or a mixture according to the invention and 1-10 wt. % dispersant (e. g. polyvinylpyrrolidone) are dissolved in up to 100 wt. % organic solvent (e.g. cyclohexanone). Dilution with water gives a dispersion.
iii) Emulsifiable Concentrates (EC)

15-70 wt. % of a compound I or II or a mixture according to the invention and 5-10 wt. % emulsifiers (e.g. calcium dodecylbenzene sulfonate and castor oil ethoxylate) are dissolved in up to 100 wt. % water-insoluble organic solvent (e.g. aromatic hydrocarbon). Dilution with water gives an emulsion.
iv) Emulsions (EW, EO, ES)

5-40 wt. % of a compound I or II or a mixture according to the invention and 1-10 wt. % emulsifiers (e.g. calcium dodecylbenzenesulfonate and castor oil ethoxylate) are dissolved in 20-40 wt. % water-insoluble organic solvent (e.g. aromatic hydrocarbon). This mixture is introduced into up to 100 wt. % water by means of an emulsifying machine and made into a homogeneous emulsion. Dilution with water gives an emulsion.
v) Suspensions (SC, OD, FS)

In an agitated ball mill, 20-60 wt. % of a compound I, preferably compound a) of formula (I), or II or a mixture according to the invention are comminuted with addition of 2-10 wt. % dispersants and wetting agents (e.g. sodium lignosulfonate and alcohol ethoxylate), 0.1-2 wt. % thickener (e.g. xanthan gum) and up to 100 wt. % water to give a fine active substance suspension. Dilution with water gives a stable suspension of the active substance. For FS type composition up to 40 wt. % binder (e.g. polyvinylalcohol) is added.
vi) Water-Dispersible Granules and Water-Soluble Granules (WG, SG)

50-80 wt. % of a compound I, preferably compound a) of formula (I), or II or a mixture according to the invention are ground finely with addition of up to 100 wt. % dispersants and wetting agents (e.g. sodium lignosulfonate and alcohol ethoxylate) and prepared as water-dispersible or water-soluble granules by means of technical appliances (e. g.

extrusion, spray tower, fluidized bed). Dilution with water gives a stable dispersion or solution of the active substance.

vii) Water-Dispersible Powders and Water-Soluble Powders (WP, SP, WS)

50-80 wt. % of a compound I, preferably compound a) of formula (I), or II or a mixture according to the invention are ground in a rotor-stator mill with addition of 1-5 wt. % dispersants (e.g. sodium lignosulfonate), 1-3 wt. % wetting agents (e.g. alcohol ethoxylate) and up to 100 wt. % solid carrier, e.g. silica gel. Dilution with water gives a stable dispersion or solution of the active substance.

viii) Gel (GW, GF)

In an agitated ball mill, 5-25 wt. % of a compound I, preferably compound a) of formula (I), or II or a mixture according to the invention are comminuted with addition of 3-10 wt. % dispersants (e.g. sodium lignosulfonate), 1-5 wt. % thickener (e.g. carboxymethylcellulose) and up to 100 wt. % water to give a fine suspension of the active substance. Dilution with water gives a stable suspension of the active substance.

ix) Microemulsion (ME)

5-20 wt. % of a compound I, preferably compound a) of formula (I), or II or a mixture according to the invention are added to 5-30 wt. % organic solvent blend (e.g. fatty acid dimethylamide and cyclohexanone), 10-25 wt. % surfactant blend (e.g. alcohol ethoxylate and arylphenol ethoxylate), and water up to 100%. This mixture is stirred for 1 h to produce spontaneously a thermodynamically stable microemulsion.

x) Microcapsules (CS)

An oil phase comprising 5-50 wt. % of a compound I, preferably compound a) of formula (I), or II or a mixture according to the invention, 0-40 wt. % water insoluble organic solvent (e.g. aromatic hydrocarbon), 2-15 wt. % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt. % of a compound I, preferably compound a) of formula (I), or II according to the invention, 0-40 wt. % water insoluble organic solvent (e.g. aromatic hydrocarbon), and an isocyanate monomer (e.g. diphenylme-thene-4,4'-diisocyanate) are dispersed into an aqueous solution of a protective colloid (e.g. polyvinyl alcohol). The addition of a polyamine (e.g. hexamethylenediamine) results in the formation of a polyurea microcapsule. The monomers amount to 1-10 wt. %. The wt. % relate to the total CS composition.

xi) Dustable Powders (DP, DS)

1-10 wt. % of a compound I, preferably compound a) of formula (I), or II or a mixture according to the invention are ground finely and mixed intimately with up to 100 wt. % solid carrier, e.g. finely divided kaolin.

xii) Granules (GR, FG)

0.5-30 wt. % of a compound I, preferably compound a) of formula (I), or II or a mixture according to the invention is ground finely and associated with up to 100 wt. % solid carrier (e.g. silicate). Granulation is achieved by extrusion, spray-drying or the fluidized bed.

xiii) Ultra-Low Volume Liquids (UL)

1-50 wt. % of a compound I, preferably compound a) of formula (I), or II or a mixture according to the invention are dissolved in up to 100 wt. % organic solvent, e.g. aromatic hydrocarbon.

The compositions types i) to xi) may optionally comprise further auxiliaries, such as 0.1-1 wt. % bactericides, 5-15 wt. % anti-freezing agents, 0.1-1 wt. % anti-foaming agents, and 0.1-1 wt. % colorants.

In a preferred embodiment, the composition is a formulation type that can be easily diluted. Therefore, in a preferred embodiment, the formulation type is selected from SC, EC and WG. In a preferred embodiment, the formulation type is WG (wettable granule).

In another embodiment, the composition is a dustable powder (DP), which can also easily be applied to relevant spots of infestation or potential infestation.

Therefore, the present invention relates to methods or uses as described herein, wherein the mixture of alpha-cypermethrin and dinotefuran is provided as a concentrated composition selected from suspension concentrate (SC), emulsion concentrate (EC), dustable powder (DP) and wettable granule (WG).

The (concentrated) compositions generally comprise between 0.01 and 95%, preferably between 0.1 and 90%, preferably between 0.5 and 75%, and most preferably between 10 to 40%, or 25 to 35% by weight of active substances. Weight % is abbreviated herein as "wt. %". The active substances are employed in a purity of from 90% to 100%, preferably from 95% to 100% (according to NMR spectrum).

Various types of oils, wetters, adjuvants, and other actives (e.g. further insecticides) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1 The user applies the composition according to the invention usually from a predosage device. Usually, in the case of concentrated dilutable formulations (e.g. SC, EC, WG), the composition is made up with water, buffer, and/or further auxiliaries to the desired application concentration and the ready-to-use spray liquor or the agrochemical composition according to the invention is thus obtained.

Usually, an amount of 5 to 10 g, preferably 5.5 to 7 g, of mixture of active compounds will treat a surface of 1000 square feet. This amount of 5 to 10 g, preferably 5.5 to 7 g, of mixture of active compounds will need about one gallon water (3785.41 ml) to achieve the diluted spray mixture. According to one embodiment, individual components of the composition according to the invention such as parts of a kit or parts of a mixture may be mixed by the user himself in a spray tank and further auxiliaries may be added, if appropriate.

In a further embodiment, either individual components of the composition according to the invention or partially premixed components, e. g. components comprising mixtures of the present invention, may be mixed by the user in a spray tank and further auxiliaries and additives may be added, if appropriate.

In a further embodiment, either individual components of the composition according to the invention or partially premixed components, e. g. components comprising mixtures of the present invention, can be applied jointly (e.g. after tank mix) or consecutively.

Application Methods

To detect the presence of bed bugs, a careful visual inspection is typical. Monitoring devices may also be used, e.g. pitfall traps, sticky traps. Treatment is usually initiated upon detection though it may also be made as a prevention.

In the methods and uses of the present invention, the mixture of the present invention is applied to said bed bugs, their habitat, breeding grounds or inside human habitation buildings. Thus, the bed bugs are killed and prevented from biting humans and irritating them and/or causing psychological distress.

The "method of combating or controlling bed bugs" or the "use" of the mixture comprising alpha-cypermethrin and dinotefuran as used herein is understood to be the non-therapeutic method/non-therapeutic use.

In one embodiment of the invention, the mixture of the present invention is provided in one of the concentrated compositions described above, which the user dilutes, preferably with water, to get a spray solution. The spray solution is then applied to said bed bugs, their habitat, breeding grounds or inside human habitation buildings. Especially, surfaces are treated which are inside human habitation buildings.

In the present invention, "human habitation buildings" are understood to be buildings or closed spaces, where humans or their belongings are located for a significant time, and especially where humans spend time sleeping, e.g. domestic dwellings (homes, apartments, huts, and dormitories, for example), hotels, motels, inns, hospitals, assisted living centers, retirement communities, military barracks, homeless shelters, sheds, cabins, schools, resorts, mobile homes, campgrounds, residential buildings, theme parks, vehicles like autos, buses, boats, trains, aircrafts (planes), ships, cargo areas and storage, shelter, or living spaces.

In a preferred embodiment of the invention, the human habitation building is a house, an apartment, a hotel, motel or inn, or a passenger aircraft.

In one embodiment, the bedroom of a human habitation building is treated, especially the bed itself. Especially, the areas in, under and around the bed and upholstered furniture are treated. Especially, the headboard, box springs, mattresses and the floor under the bed are treated. Especially, the bed frames, box springs, inside empty dressers and clothes closets, carpet edges, high and low wall moldings, and wallpaper edges are treated.

Especially, the area underneath cabinets and drawers are treated.

Also, the corners of the floor and the baseboards are treated.

Especially, any cracks or crevices are treated, as the bed bugs tend to hide there during the day.

Therefore, in one embodiment, the present invention relates to methods or uses as described herein, wherein the mixture of alpha-cypermethrin and dinotefuran is applied to a bedroom of a human habitation building, in particular to areas selected from bed frames, box springs, headboard, mattresses and the floor under the bed, upholstered furniture, inside dressers and clothes closets, carpet edges, high and low wall moldings, and wallpaper edges.

Although it is in principle possible to treat also textile subjects according to the methods or uses of the invention, these items are preferably treated by washing and high temperatures. Nevertheless, it is in principle possible to treat beddings, bed covers, pillows, bed linens, or clothes with the mixture according to the invention.

In another embodiment, the present invention relates to methods or uses as described herein, wherein the mixture of alpha-cypermethrin and dinotefuran is applied to an area of public transportation, in particular selected from passenger aircrafts, taxis, passenger trains, in particular to the area of the seats.

As used herein, the term "treating" or "treated" means applying the mixture of the present invention to the mentioned surfaces or areas. For example, a spray solution may be prepared and sprayed on the surfaces, e.g. walls, floor, furniture. After drying, a certain amount of the mixture of the present invention is present on the surface. When a bed bug crawls and sits on such a surface, the bed bug is automatically contacted with the insecticides of the mixture of the present invention and will be killed or at least paralyzed very soon.

As used herein, the term "combating" means reducing the number of bed bugs, preferably to zero or close to zero. The reduction of the number of bed bugs is achieved by inactivating, i.e. killing or at least paralyzing the bed bugs.

As used herein, the term "controlling" means taking measures to reduce the number of bed bugs to a tolerable minimum or even zero. The effect of the measure may be later than the measure itself. If the measures are taken as a prevention measure, this is also understood as "controlling".

In general, "pesticidally effective amount" means the amount of active ingredient(s) needed to achieve an observable effect on growth, including the effects of necrosis, death, retardation, prevention, and removal, destruction, or otherwise diminishing the occurrence and activity of the target organism. The pesticidally effective amount can vary, depending on the mixture ratio and the composition.

For use in combating or controlling bed bugs, the rate of application of the active ingredients of the mixture of the present invention may be in the range of 1 to 500 g per 1000 square feet of surface, preferably from 1 to 100 g per 1000 square feet, preferably from 1 to 10 g per 1000 square feet, preferably from 5 to 10 g per 1000 square feet, preferably 5.5 to 7 g per 1000 square feet.

As described above, the mixture of the present invention is provided as a concentrated composition, e.g. a suspension concentrate (SC) or a wettable granule (WG). The user dilutes a defined amount of this composition in a defined amount of liquid, preferably water, and applies the resulting spray solution. Normally, an aqueous spray solution is 0.01 to 15 wt. %, or 0.01 to 10, or 0.01 to 5, or 0.1 to 10, or 0.1 to 5, or 0.1 to 1, or 0.1 to 0.5 wt. %. The amounts to be used are normally indicated on an instruction sheet accompanying the concentrated composition. For example, a 30% WG formulation (alpha-Cypermethrin: 10%, dinotefuran: 20%) is provided, and the user is instructed to dilute 19 g of the WG composition in 1 gallon water (3785.41 ml), which is sufficient for 1000 square feet surface. The resulting spray solution is 0.15 wt. %. Higher amounts of spray solution can be prepared by using the same proportion of composition and water.

During peak season, the spray application will be repeated monthly or at intervals of 7 days or at intervals of 3 to 7 days, or at intervals of 3 to 31 days, depending on the number of bed bugs present.

The application is usually done by a backpack sprayer or a similar spraying device like a handheld pump or power sprayer. The solution should be spread evenly on the surface(s). If the surface has cracks or corners, these should be treated in the same way.

Formulations of the mixtures of the present invention can also be provided as aerosols (e.g in spray cans), oil sprays or pump sprays, or dustable powder, which are suitable for the non-professional user for controlling bed bugs. Aerosol recipes are preferably composed of the active compounds or mixtures of the present invention, solvents, furthermore auxiliaries such as emulsifiers, perfume oils, if appropriate stabilizers, and, if required, propellants.

The oil spray formulations differ from the aerosol recipes in that no propellants are used.

For use in spray compositions, the content of active ingredient is from 0.001 to 80 weights %, preferably from 0.01 to 50 wt. % and most preferably from 0.01 to 15 wt. %.

The mixtures of the present invention and its respective compositions can also be used in fumigating coils, smoke cartridges, vaporizer plates or long-term vaporizers and also in moth papers, moth pads or other heat-independent vaporizer systems.

Methods to control infectious diseases transmitted by bed bugs (e.g. malaria, dengue and yellow fever, lymphatic filariasis, and leishmaniasis) with mixtures of the present invention and its respective compositions also comprise treating surfaces of huts and houses, air spraying and impregnation of curtains, tents, clothing items, bed nets, tsetse-fly trap or the like. Insecticidal compositions for application to fibers, fabric, knit goods, nonwovens, netting material or foils and tarpaulins preferably comprise a mixture including the insecticide, optionally a repellent and at least one binder.

Biological Tests

Synergism can be described as an interaction where the combined effect of two or more compounds is greater than the sum of the individual effects of each of the compounds. The following tests demonstrate the control efficacy of compounds, mixtures or compositions of this invention on specific pests. However, the pest control protection afforded by the compounds, mixtures or compositions is not limited to these species. In certain instances, combinations of a compound of this invention with other invertebrate pest control compounds or agents are found to exhibit synergistic effects against certain important invertebrate pests.

Methods

1.) Testing

Glass vials (20 mL scintillation) were treated with 445 μL of varying concentrations of α-cypermethrin dissolved in acetone, respectively dinotefuran or mixtures of α-cypermethrin and dinotefuran in the indicated ratios. Vials were turned on their sides and placed on an automated roller table. The vials were rolled (6 rpm) uncapped to allow an even coating of the treatment. After rolling, vials were allowed to completely dry for at least an hour. Each treatment was replicated five times. Approximately six bed bugs, *Cimex lectularius*, were placed into each vial and were exposed to treatments at room temperature for the duration of the study.

2.) Synergy Testing:

After dose response testing, assays combining two active ingredients were conducted using the same method described above. The rates used in the combination treatments for each active ingredient, α-cypermethrin and dinotefuran, were the same concentrations used when they were tested independently.

3.) Synergy Analysis:

When applied in combination, the toxicological interaction between two compounds is classified based on the resultant impact on the observed effect. The interaction is termed antagonistic when the observed effect is less than the Colby expected mortality based on the responses of the two compounds applied independently at the same doses. When the observed effect of two compounds applied in combination is equal to that of the Colby expected mortality based on the responses of the two compounds applied independently, the relationship is described as additive. Finally, a synergistic interaction means that the effect of the two compounds applied in combination is greater than the Colby expected mortality based on the responses of the two compounds applied independently at the same doses.

Ataxia+mortality data at 48 hours were used to determine whether there was a synergistic effect in the combined use of α-cypermethrin and dinotefuran.

Abbott's correction for control mortality and the Colby method for testing synergy were used to analyze combination data. The method is as follows:

Abbott's corrected mortality per observation (at 3 DAE)=[(% observed mortality−% control mortality)/(100%−% control mortality)]×100.

Colby's expected mortality per combination observation=% mortality (*A*)+% mortality (*B*)−(% mortality (*A*)×% mortality (*B*))/100.

Synergy ratio=% observed mortality/% Colby expected mortality.

Additive interactions have synergy ratios equal to 1, antagonistic interactions have synergy ratios of less than 1, and synergistic interactions have synergy ratios of greater than 1.

TABLE 1

Toxicological interaction between a-cypermethrin and dinotefuran against *C. lectularius* in a residual contact assay

| Treatment | Mortality (%) @ 72 h | Abbott's CM* | Colby Expected** | Synergy Ratio† |
|---|---|---|---|---|
| Acetone control | 3.3 | 0.0 | | |
| 1 ppm alpha-cypermethrin | 26.7 | 24.1 | | |
| 2 ppm dinotefuran | 6.7 | 3.4 | | |
| 4 ppm dinotefuran | 6.7 | 3.4 | | |
| 6 ppm dinotefuran | 6.7 | 3.4 | | |
| 8 ppm dinotefuran | 6.7 | 3.4 | | |
| Alpha 1 ppm + Dino 2 ppm | 40.0 | 37.9 | 26.8 | 1.4 |
| Alpha 1 ppm + Dino 4 ppm | 33.3 | 31.0 | 26.8 | 1.2 |
| Alpha 1 ppm + Dino 6 ppm | 43.3 | 41.4 | 26.8 | 1.5 |
| Alpha 1 ppm + Dino 8 ppm | 56.7 | 55.2 | 26.8 | 2.1 |

*Abbott's corrected mortality, [(treatment mortality − control mortality)/(100 − control mortality)] *100

**Colby expected value, E(A) + E(B) − E(A) * E(B)/100

†Synergy ratio value, Observed/Colby expected

The test results show that, by virtue of strong synergism, the activity of the mixtures according to the invention is considerably higher than had been predicted using Colby's formula.

The invention claimed is:

1. A method for combating or controlling bed bugs, comprising applying a synergistically effective amount of a mixture of the active agents, alpha-cypermethrin and dinotefuran in a weight ratio of from 500:1 to 1:500 to said bed bugs, their habitat or breeding grounds, or inside human habitation buildings.

2. The method according to claim 1, wherein the bed bug is selected from *Cimex lectularius* and *Cimex hemipterus*.

3. The method according to claim 1, wherein the mixture of alpha-cypermethrin and dinotefuran is present in a weight ratio of 20:1 to 1:20.

4. The method according to claim 1, wherein the mixture of alpha-cypermethrin and dinotefuran is provided as a concentrated composition selected from suspension concentrate (SC), emulsion concentrate (EC), dustable powder (DP), and wettable granule (WG).

5. The method according to claim 1, wherein the mixture of alpha-cypermethrin and dinotefuran is provided as a wettable granule which comprises between 0.01 and 95% by weight of active substances.

6. The method according to claim 1, wherein the mixture of alpha-cypermethrin and dinotefuran is applied as an aqueous spray solution.

7. The method according to claim 6, wherein the spray solution has a concentration of 5 to 10 g of mixture of alpha-cypermethrin and dinotefuran, per one gallon of water.

8. The method according to claim 7, wherein the spray solution of 5 to 10 g of mixture of alpha-cypermethrin and dinotefuran in one gallon of water is used to treat 1000 square feet.

9. The method according to claim 1, wherein the application is repeated at intervals of 3 to 31 days.

10. The method according to claim 1, wherein the mixture is applied to surfaces inside human habitation buildings which are selected from homes, apartments, huts, dormitories, hotels, motels, inns, hospitals, assisted living centers, retirement communities, military barracks, sheds, cabins, schools, resorts, mobile homes, campgrounds, residential buildings, theme parks, autos, buses, boats, trains, aircrafts, ships, cargo areas and storage, shelters, or living spaces.

11. The method according to claim 1, wherein the mixture is applied to a bedroom of a human habitation building.

12. The method according to claim 1, wherein the breeding ground is selected from an area of public transportation.

13. The method according to claim 1, wherein the bed bugs are pyrethroid-resistant.

\* \* \* \* \*